Apr. 3, 1923.

D. C. RUTH 1,450,645

SEPARATOR

Filed July 10, 1922

Inventor

D. C. Ruth

By  Lacy & Lacy, Attorneys

Apr. 3, 1923.

D. C. RUTH

SEPARATOR 1,450,645

Filed July 10, 1922

Inventor

D. C. Ruth

By Lacey & Lacey, Attorneys

Patented Apr. 3, 1923.

1,450,645

UNITED STATES PATENT OFFICE.

DAVID C. RUTH, OF HALSTEAD, KANSAS, ASSIGNOR OF ONE-HALF TO S. ELLA L. RUTH, OF HALSTEAD, KANSAS.

SEPARATOR.

Application filed July 10, 1922. Serial No. 573,945.

*To all whom it may concern:*

Be it known that I, DAVID C. RUTH, a citizen of the United States, residing at Halstead, in the county of Harvey and State of Kansas, have invented certain new and useful Improvements in Separators, of which the following is a specification.

This invention relates to the means for separating grain from straw and chaff and has for its object the provision of an improved construction of machine whereby the operation of cleaning the grain and separating the same from the straw and chaff will be performed more expeditiously and less expensively than is possible with the machinery now most generally employed. The invention provides means whereby the grain is separated from the straw immediately after passing the threshing cylinder, and the straw at once moved upwardly so that a further separation of the straw and any grain that may have been caught thereon will be effected. The invention is illustrated in the accompanying drawings and will be hereinafter fully set forth.

In the drawings—

Figure 1:
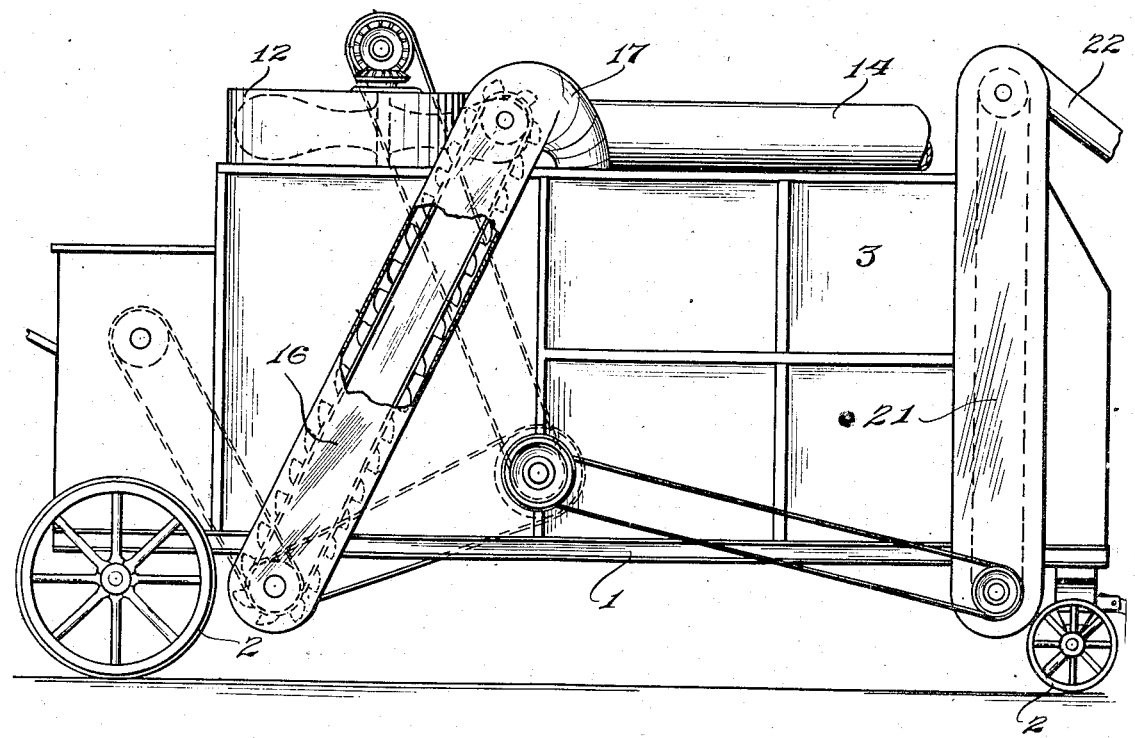
Figure 1 is a side elevation, partly broken away, of an apparatus embodying my improvements.
Figure 2:
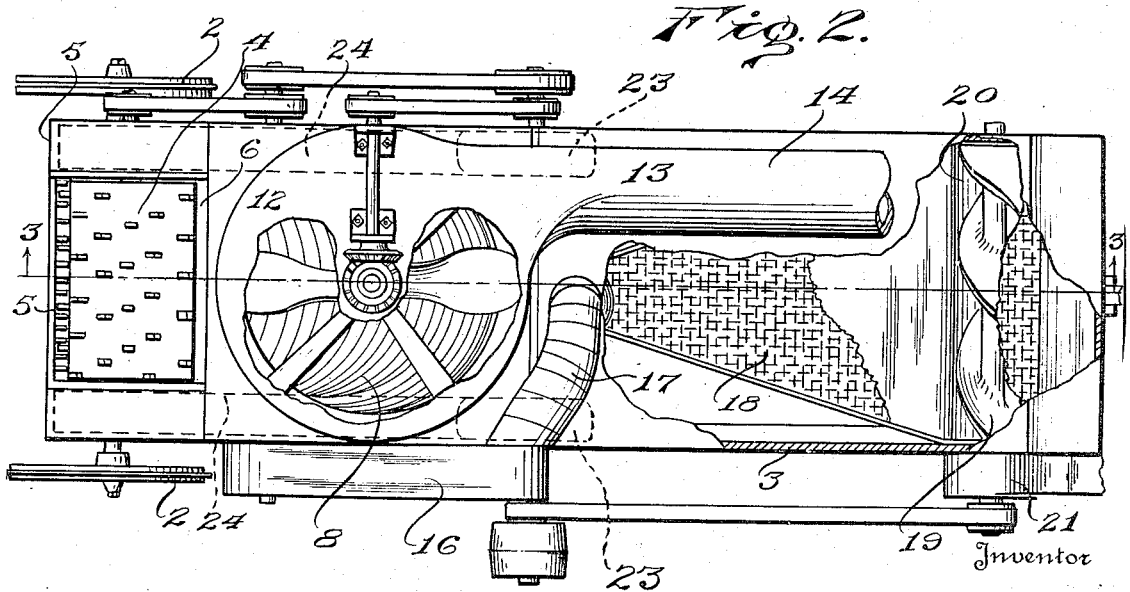
Fig. 2 is a plan view of the same, partly broken away.
Figure 3:
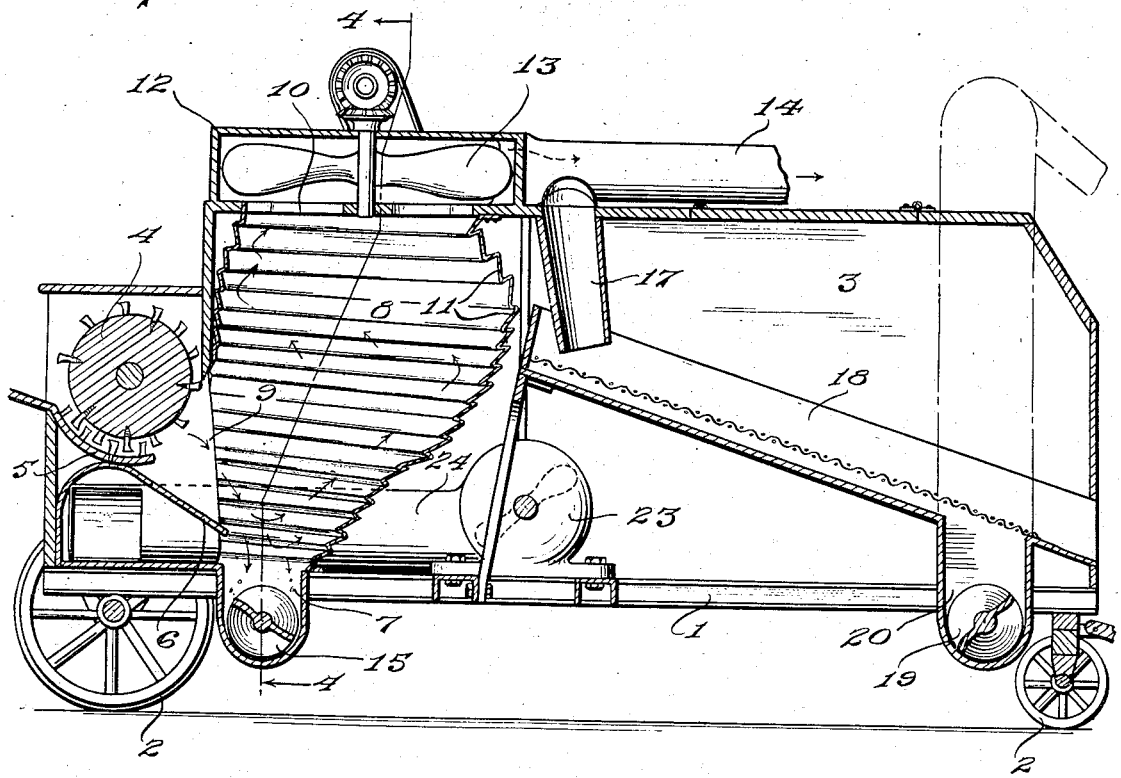
Fig. 3 is a longitudinal section on the line 3—3 of Fig. 2.
Figure 4:
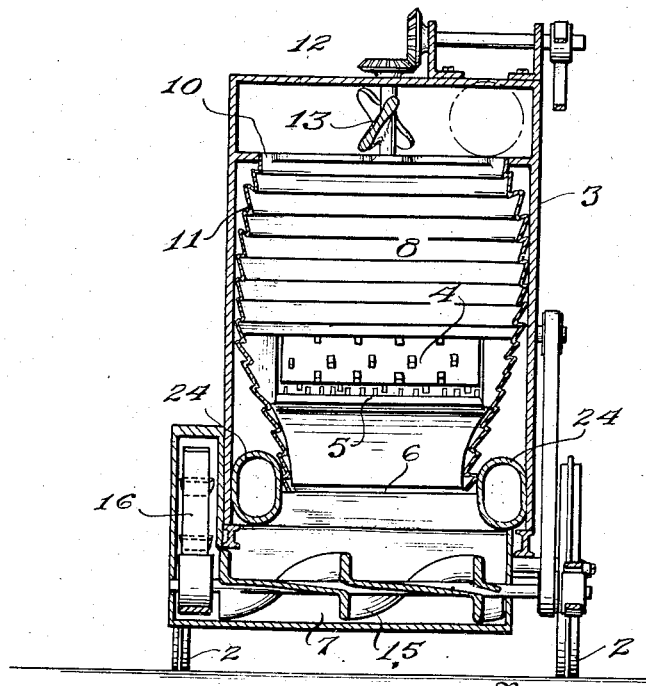
Fig. 4 is a transverse section on the line 4—4 of Fig. 3.

The reference numeral 1 indicates a truck mounted upon ground wheels 2 whereby the machine may be transported from point to point as it may be needed for use. Upon the truck 1 is secured in any desired manner a housing or casing 3 which encloses most of the working parts of the apparatus. At the entrance end of the housing is mounted a threshing cylinder 4 and a concave 5 co-operating therewith, said cylinder and concave being of the usual construction, and below the concave is a downwardly inclined deflecting plate 6 which terminates short of the truck or floor of the housing and over a conveyer trough 7 which is supported by the truck. Immediately in rear of the cylinder and concave and the deflecting plate 6 is a separating chamber 8 which has its lower end or bottom open and coinciding with the top of the trough 7, which trough is disposed transversely of the truck, as clearly shown in Figs. 3 and 4. The separating chamber 8 is in direct communication, as shown at 9, with the outlet space from the cylinder and concave and its upper end is fixed to the top of the casing and coincides with an outlet 10 formed therein. This separating chamber may conveniently be formed of sheet metal given the proper form, and it will be readily noted that it expands upwardly. It will also be noted that it is corrugated, as indicated at 11, so as to present annular ridges or ribs which will tend to deflect and momentarily arrest the flow of grain which enters the chamber from the cylinder and concave. Upon the top of the housing or casing 3 immediately over the outlet 10, I secure a fan casing 12 in which is disposed a suction fan 13 which is mounted upon a vertical axis and is driven from a prime motor simultaneously with the other working parts of the apparatus, as will be readily understood. From the fan casing 12, a discharge spout 14 extends beyond the end of the housing, and this spout may be connected with a stacker in the usual manner so that the straw passing through said chute may be piled or scattered, as may be deemed most advantageous. In the trough 7 is disposed a screw conveyer 15 which delivers the grain caught in the trough to an elevator 16 mounted on the side of the housing 3 and arranged to deliver the grain through a spout 17 into the re-cleaning chamber of the main casing 3. This re-cleaning chamber contains a screen 18 which may be oscillated in any desired manner and at the lower end of the said screen is disposed a screw conveyer 19 operating in a transverse trough 20 and delivering the grain to an elevator 21 which may be arranged to convey the cleaned grain to a weighing machine or deliver it into sacks through a spout 22, as will be readily understood. Within the main casing 3 and at the sides of the same are blowers or fans 23, from the casings of which extend conduits 24 delivering into the space below the deflecting plate 6, which plate, together with the bottom or floor of the main casing, constitutes an air trunk whereby the blast from the blowers 23 will be delivered into the bottom of the chamber 8 across the top of the trough 7.

In operation, the suction fan 13, the blowers 23, and the several conveyers are actuated simultaneously with the threshing cylinder and a strong upward draft is thereby created through the separating chamber 8 in an obvious manner. The threshing cylinder separates the grain from the straw and chaff and is usually operated at a high speed so that the grain and straw acquire considerable momentum and are delivered into the separating chamber 8 with considerable force so that the grain will be thrown against the corrugated walls of the separating chamber and will be thereby checked and released from the straw and chaff so that it will at once drop into the trough 7 from which it will be carried by the screw conveyer, as will be readily understood, while the straw and chaff passes upward and out through the opening 10. It will also be readily understood that a great part of the grain drops upon the deflecting plate 6 from the concave and gravitates directly into the trough 7. In my apparatus, the straw is drawn upwardly into the fan casing 13 and is then given a sharp turn horizontally to enter the stacking chute and the speed imparted to the straw by the cylinder will be maintained and accelerated by the combined action of the suction fan 13 and the blast from the air trunk into which the conduits 24 deliver. The result is that the straw is not permitted to accumulate so as to choke the operation of any of the parts but is kept in a steadily moving stream which is of mist-like proportions and quality which permits the heavier grain to readily drop to the trough 7. The impact of the straw and chaff against the corrugated walls of the separating chamber also further accelerate the separation from the same of any grain that may be possibly adhering thereto so that within a very small space and without the use of moving parts I am enabled to very expeditiously separate the grain from the straw and chaff and other matter and thereby very materially reduce the cost of operation. Moreover, the initial cost of production of a machine embodying my invention is vastly less than the cost of producing the machines now generally employed which include a number of shaking riddles or screens and mechanisms for operating the same. While I prefer to provide a re-cleaning sieve, as indicated at 18, it is to be understood that the provision of this screen is not always necessary as generally the separation of the grain from the chaff, dirt, and straw is complete within the separating chamber 8. It is to be particularly noted that in my present apparatus the straw passes directly upwardly into the casing of the suction fan so that it is not diverted from a straight path prior to passing into said casing and, therefore, it does not tend to choke the operation of the separating chamber. A machine constructed in accordance with my invention is obviously simple and, therefore, may be operated very easily inasmuch as the frictional resistance is minimized.

Having thus described the invention, what is claimed as new is:

A grain separator comprising in combination with a threshing mechanism, an air trunk disposed below the threshing mechanism, a grain conveyer arranged in juxtaposition to said air trunk whereby the trunk will deliver a blast across the top of the said conveyer, a separating chamber rising from said conveyer and having its bottom and front side in direct communication therewith and with the threshing mechanism and air trunk, said chamber expanding upwardly and having an outlet opening through its upper end, annular deflecting ribs extending entirely around the walls of said chamber from the bottom to the top of the same, a fan casing covering the upper end of the separating chamber and in direct communication with the chamber through the upper end thereof, a suction fan mounted within said fan casing, and a stacking chute leading from said fan casing.

In testimony whereof I affix my signature.

DAVID C. RUTH. [L. S.]